United States Patent [19]

Bodensieck et al.

[11] Patent Number: 4,658,340
[45] Date of Patent: Apr. 14, 1987

[54] HEADLIGHT FOR A MOTOR VEHICLE

[75] Inventors: Hans-Rudolf Bodensieck, Gerlingen; Karl-Otto Dobler; Horst Hänel, both of Reutlingen; Kurt Kohler, Renningen; Frieder Liedtke, Dettingen; Siegfried Seliger, Oberstenfeld, all of Fed. Rep. of Germany

[73] Assignee: Robert Bosch GmbH, Stuttgart, Fed. Rep. of Germany

[21] Appl. No.: 786,312

[22] Filed: Oct. 10, 1985

[30] Foreign Application Priority Data

Oct. 11, 1984 [DE] Fed. Rep. of Germany ....... 3437323

[51] Int. Cl.4 .............................................. F21V 15/00
[52] U.S. Cl. ...................................... 362/267; 362/61; 362/362
[58] Field of Search ....................... 215/237, 245, 353; 362/61, 80, 267, 362

[56] References Cited

U.S. PATENT DOCUMENTS

| 280,938 | 7/1883 | Luger | 215/237 |
|---|---|---|---|
| 843,802 | 2/1907 | Fenn | 215/353 X |
| 3,598,989 | 8/1971 | Biggs | 362/61 X |
| 3,851,783 | 12/1974 | Braginetz | 215/232 |
| 4,264,944 | 4/1981 | Deverrewaere | 362/61 |
| 4,363,086 | 12/1982 | Fletcher | 362/368 |

FOREIGN PATENT DOCUMENTS

| 2040360 | 6/1971 | Fed. Rep. of Germany | 362/267 |
|---|---|---|---|
| 3001925 | 7/1981 | Fed. Rep. of Germany | 362/61 |
| 2031576A | 4/1980 | United Kingdom . | |

Primary Examiner—Margaret A. Focarino
Assistant Examiner—Allen J. Flanigan
Attorney, Agent, or Firm—Michael J. Striker

[57] ABSTRACT

In a headlight including a housing supporting a reflector with a bulb and having an opening for handling the bulb, a hood of elastic material is provided, which closes the opening from the rear side of the housing. An annular sealing lip is provided on the hood itself which in assembly lies against the outer surface of the conical ring portion formed on the rear wall of the housing. An open hinge with bellows and a tongue, engageable with a shoulder on the rear wall of the housing, is provided at one side of the hood and a snap arrangement is provided on a diametrically opposite side of the hood to secure the hood to the housing.

4 Claims, 5 Drawing Figures

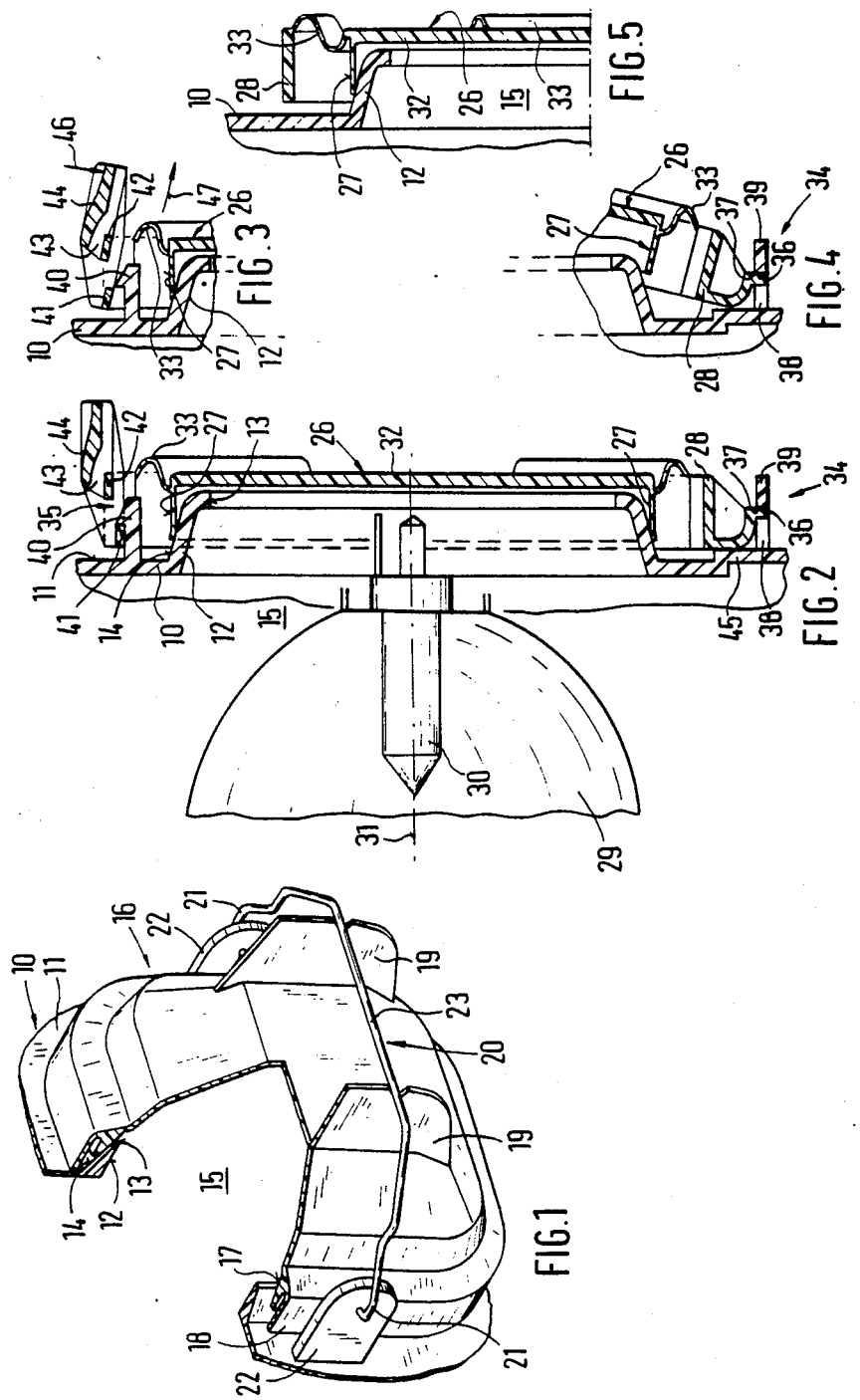

HEADLIGHT FOR A MOTOR VEHICLE

BACKGROUND OF THE INVENTION

The present invention relates to a headlight for a motor vehicle.

Headlights of the foregoing type normally include a reflector with a bulb in its interior and a hood connected to a housing of the headlight which carries the reflector.

A headlight of the type under discussion has been disclosed for example in GM No. 7,606,518. A sealing element in this known headlight is a profiled sealing ring of rubber inserted in a groove of the hood. To manufacture this sealing element exact temperatures and time periods as well as rubber mixtures must be determined in a method of producing such sealing elements to ensure sufficient elasticity and resistance to aging of such sealing elements.

The disadvantage of such profiled sealing rings resides in that they should be glued into the grooves of the hoods, and special controlled gluing stations as well as time for the hardening and handling of glue materials are required.

SUMMARY OF THE INVENTION

It is an object of the present invention to provide an improved headlight for motor vehicles.

It is another object of this invetnion to provide an improved locking means for securing a hood of the headlight to the housing supporting the reflector and the bulb.

These and other objects of the invention are attained by a headlight for motor vehicles comprising a housing having an opening for handling a bulb inserted in a reflector supported in said housing; a hood; sealing means, said hood sealingly closing said openings with an interposition of said sealing means; and locking means for securing said hood to said housing, said housing having a rear wall and a conical ring-shaped portion extended from said rear wall and having an edge, said conical portion having an outer surface tapering to said edge, said hood being made of elastic plastics and including an elastic sealing lip which forms said sealing means, said sealing lip, upon securing of said hood to said housing, lying on said outer surface of said conical portion.

The headlight proposed herein offers a ring-shaped sealing lip made of one piece with the hood and they both are formed of plastics.

Radial elasticity of the circular sealing lip ensures a sealed closure of the opening in the housing by the hood even under difficult operational conditions.

The locking means may include a two-arm fastening spring which has two lateral arms pivotally supported in said rear wall of said housing and an intermediate portion, extended between said arms, said intermediate portion, upon being pulled on said hood, exerting an axial force on said sealing lip.

The locking means may be of two parts and include an open hinge and a snap device diametrically opposing said hinge, said hood including a radially elastic portion which connects the hood with said locking means.

The radially elastic portion may be a multi-part ring-shaped bellows which is tip-stretched on said hold and has a pressure ring which carries said locking means.

The open hinge may include a tongue radially extended from said pressure ring and a shoulder provided on said rear wall of said housing, said tongue being supported on said shoulder upon mounting of said hood to said housing. The structure of the hinge provides for additional compensation of tolerances between the housing and the hood, whereby setting properties of elastic plastics such as "plastic flow" can be compensated for, and the deformability of the material, the restoring force of the annular lip, and the elasticity of the bellows can be adjusted to each other.

The housing may have a flange formed with a recess, said shoulder being formed by a wall of said recess, said rear wall of the hood having a radially extended portion positioned opposite to said shoulder, said tongue also lying against said portion upon mounting of said hood to said housing.

The rear wall of the housing may having a hook axially extended therefrom, said pressure ring having a locking web engageable with said hook, said hook and said web forming said snap device, said snap device further including an actuating lever provided on said pressure ring and actuated to snap said web behind said hook.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view with a cut-off section of the housing with a hood attached thereto and having a fastening spring forming a locking device according to a first embodiment of the invention, on a decreased scale;

FIG. 2 is a sectional view of the hood with a locking device with a snap connection of a second embodiment, on a natural scale;

FIG. 3 is a partial sectional view of the snap connection in the open position, of the embodiment of FIG. 2;

FIG. 4 is a partial sectional view of the open joint of the embodiment of FIG. 2; and FIG. 5 is a sectional view of the hood near the snap connection of the embodiment of FIG. 2.

DETAILED DESCRIPTION OF THE PREFERRED EMBODIMENTS

Referring now to the drawings in detail, and firstly to FIG. 1 which depicts a first embodiment of the invention, it will be seen that the headlight comprises a housing 10, on a rear side 11 of which a conical ring portion 12 is deformed, which has an outer surface 14 which tapers toward the edge 13. The conical ring portion 12 encloses an opening 15 for manipulating a bulb which is inserted in a reflector as shown in FIG. 2.

A hood 16 made of elastic plastic material has a radially-elastic sealing lip 17 and a pressure ring 18 which surrounds the sealing lip 17. Hood 16 further includes two locking strips 19 which are spaced from each other and extend rearwardly. A two-arm fastening spring 20 has two lateral arms 21, which are pivotally or hingedly supported in two eyelets 22 of the housing 10, and an intermediate, substantially horizontal portion 23 extended between two arms 21 and adapted to be pulled on the locking strips 19 and locked in its functional position. Thereby hood 16 is secured to the housing 10 and the sealing lip 17 lies on the outer surface 14 of a conical ring 12 so that radial elasticity of this ring enclosed in the sealing lip 17 effects a sealing of the hood 16 on the housing 10.

In the second embodiment of the invention illustrated in FIGS. 2 through 5 the similar structural components are denoted by the same reference numerals as those in FIG. 1.

A reflector 29 with a bulb 30 inserted therein and protruding from its rear wall is positioned in the opening 15. Reflector 29 is secured to the housing 10 in the middle thereof. Reflector 25 and bulb 30 have a common axis 31. The hood is denoted in this embodiment by reference numeral 26 and is made of elastic plastics. Hood 26 has a substantially circular shape and is formed of a plate or bottom 32 and a hook-shaped axial sealing lip 27. A multi-part annular bellows 33, which forms a radially-elastic portion, is tip-stretched of the hood, on the one hand, and has a pressure ring 28 which is made of one piece thereof, on the other hand. Preessure ring 28 is substantially coaxial with the sealing lip 27.

A locking arrangement is of two-parts and includes a so-called open hinge 34 and a snap connection 35 diametrically opposing to the hinge 34. Hinge 34 has a tongue 36 radially protruding from the pressure ring 28 and a shoulder 37 cooperating with the tongue. Shoulder 37 forms the edge of a recess 38 of a flange 39 which extends from the rear side 11 of the housing 10. The snap connection 35 has a hook 40 extending from the rear side 11 of housing 10 and a web 41 of the pressure ring 28 which may be locked behind hook 40. In the region of the web 41, the pressure ring 28 forms a narrowing portion 42 with two lateral cheeks 43 which are connected to an actuating lever 44.

FIG. 2 shows hood 26 secured to housing 10 by the two part locking device 34, 35. As shown in FIG. 2 tongue 36 is supported on the shoulder 37 of flange 39 and simultaneously lies against the portion 45 of the rear wall 11 of the housing. In the illustrated functional position the snap connection 35 engages or locks the web 41 of the pressure ring 28, due to its elasticity, with the hook 40 of housing 10.

The open position of the locking device 35, 36 is shown in FIG. 3. The open position is obtained by the pressure exerted on the actuating lever 46 in the direction of arrow 46 and by pivoting this lever in the direction of arrow 47. Thereby the snap connection 34 is released as shown in FIG. 3.

The proposed fixing of the hood 26 to the housing 10 is carried out by the assembled hinge 34 and by the pivoting of the hood in the direction counter to that of arrow 47 to the functional position shown in FIG. 1.

It will be understood that each of the elements described above, or two or more together, may also find a useful application in other types of vehicle head lights differing from the types described above.

While the invention has been illustrated and described as embodied in a vehicle head light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for motor vehicles, comprising a housing having an opening for handling a bulb inserted in a reflector supported in said housing; a hood; sealing means, said hood sealingly closing said opening with an interposition of said sealing means; and locking means for securing said hood to said housing, said housing having a rear wall and a conical ring-shaped portion extended from said rear wall and having an edge, said conical portion having an outer surface tapering to said edge, said hood being made of elastic plastics and including an elastic sealing lip which forms said sealing means, said sealing lip, upon securing of said hood to said housng, lying on said outer surface of said conical portion, said locking means being two-part and including an open hinge and a snap device diametrically opposing to said hinge, said hood including a radially-elastic portion which connects the hood with said locking means, said radially-elastic portion being a multi-part ring-shaped bellows which is tip-stretched on said hood and has a pressure ring which carries said locking means.

2. The headlight as defined in claim 1, wherein said open hinge includes a tongue radially extended from said pressure ring and a shoulder provided on said rear wall of said housing, said tongue being supported on said shoulder upon mounting of said hood to said housing.

3. The headlight as defined in claim 2, wherein said housing has a flange formed with a recess, said shoulder being formed by a wall of said recess, said rear wall of the hood having a radially extended portion positioned opposite to said shoulder, said tongue also lying against said portion upon mounting of said hood to said housing.

4. The headlight as defined in claim 2, wherein said rear wall of said housing has a hook axially extended therefrom, said pressure ring having a locking web engageable with said hook, said hook and said web forming said snap device, said snap device further including an actuating lever provided on said pressure ring and actuated to snap said web behind said hook.

* * * * *